Dec. 21, 1943.  M. T. LOGAN  2,337,480
MULTIPLE SEAT STRUCTURE
Filed Aug. 6, 1940  2 Sheets-Sheet 1
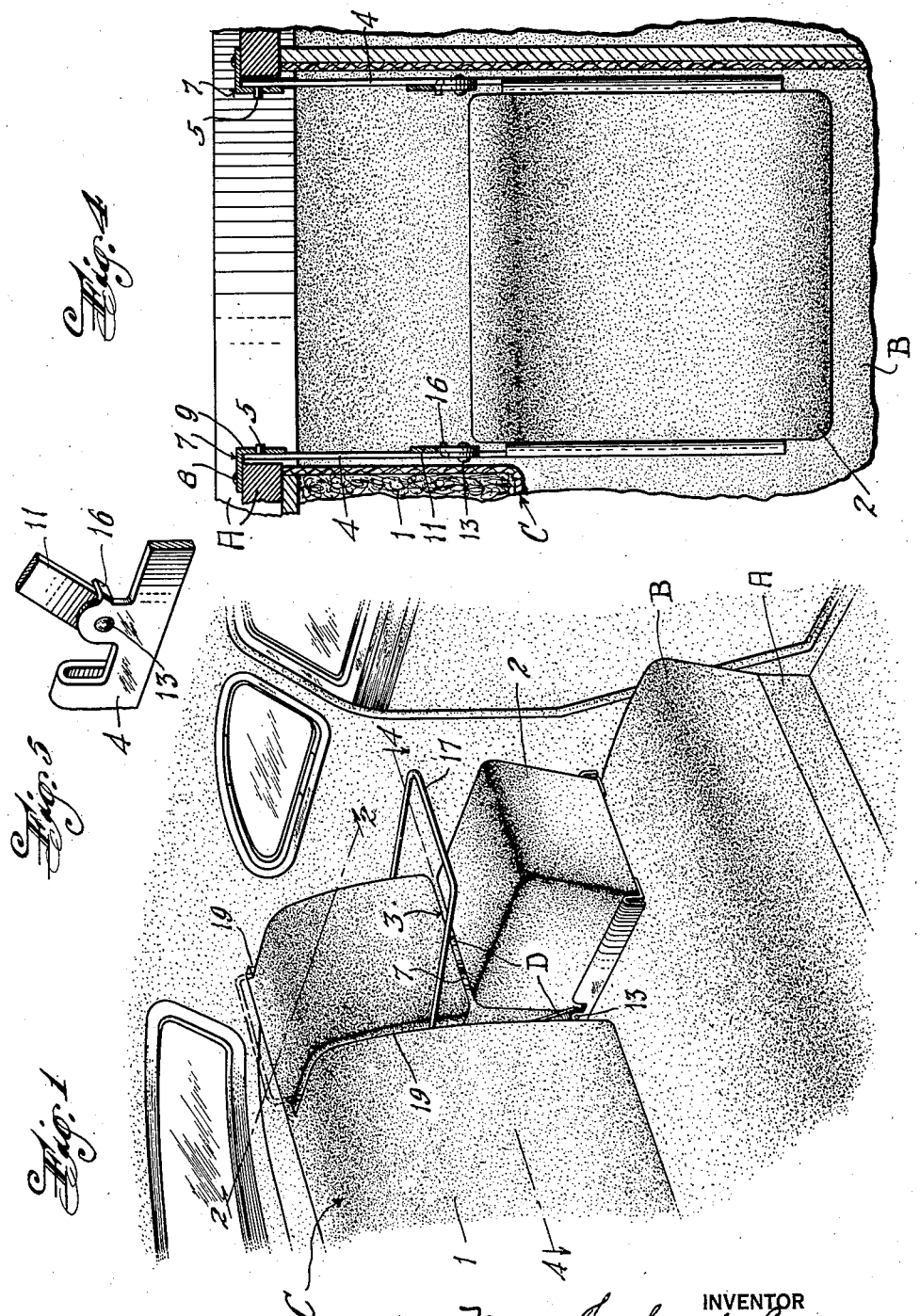
INVENTOR
Mary Tuckearch Logan,
BY Harry B. Cook.
ATTORNEY Dec. 21, 1943. M. T. LOGAN 2,337,480
MULTIPLE SEAT STRUCTURE
Filed Aug. 6, 1940 2 Sheets-Sheet 2
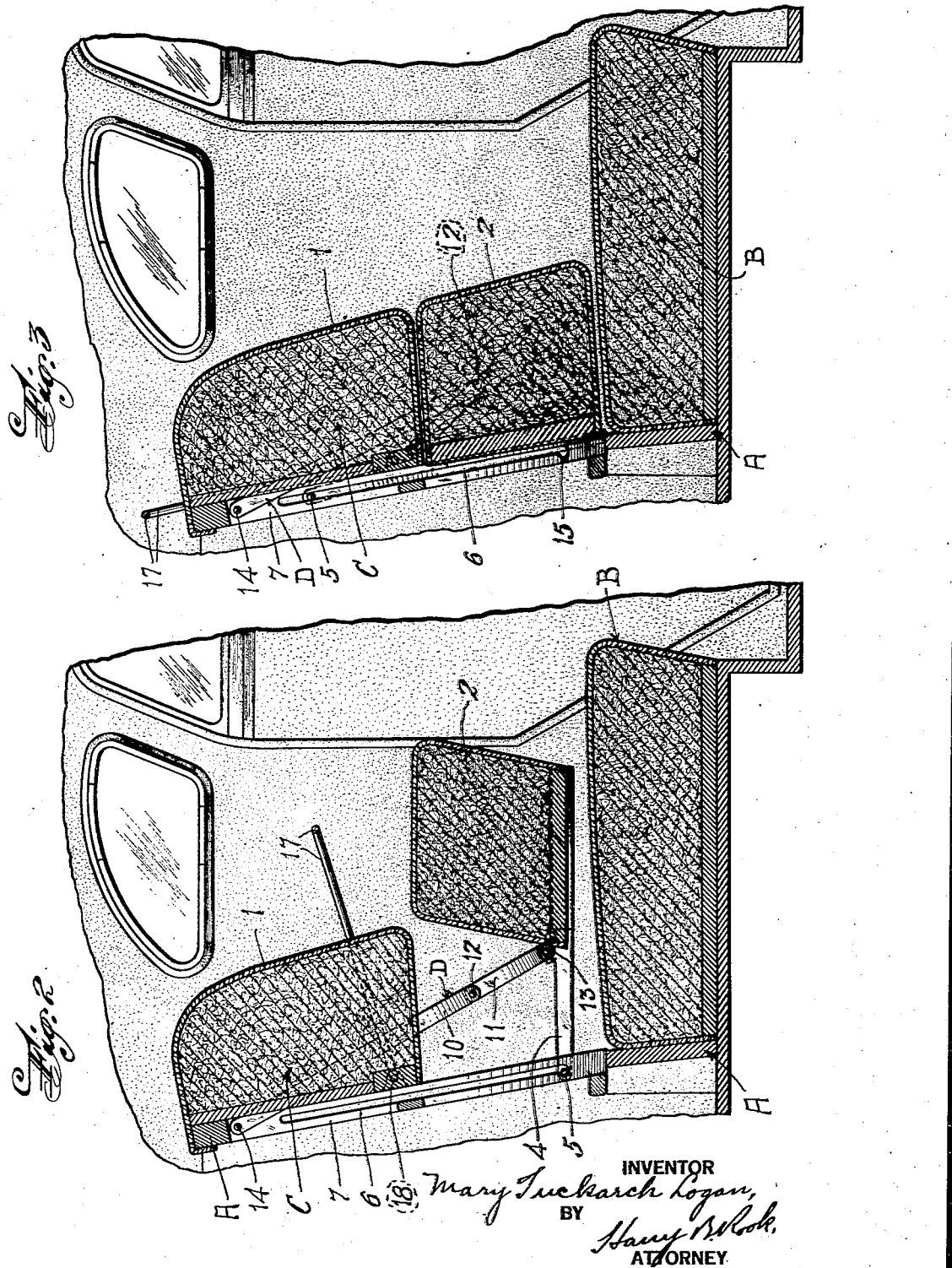
INVENTOR
Mary Tuckarch Logan,
BY
Harry B. Rook,
ATTORNEY Patented Dec. 21, 1943

2,337,480

UNITED STATES PATENT OFFICE 2,337,480

MULTIPLE SEAT STRUCTURE

Mary Tuckarch Logan, Newark, N. J.

Application August 6, 1940, Serial No. 351,577

4 Claims. (Cl. 155—132)

This invention relates in general to multiple seat structures and more particularly to a seat structure which shall include a main seat for an adult and a second seat for a small child, whereby to ensure safety to the child and comfort to both the child and the adult. The invention especially contemplates such a seat for private automobiles and busses, although the invention may be embodied in other seat structures, for example in railway coaches and Pullman cars, aeroplanes, and railway and bus stations.

One object of the invention is to provide a multiple seat structure of this character wherein the second seat normally shall form a part of the back of the main seat and, when desired, can be moved horizontally outwardly beyond the back of the main seat for supporting a person, particularly a small child.

Another object is to provide a multiple seat structure that shall comprise a main seat and a back therefor that shall include a major section in predetermined relation to the main seat and a smaller section movably mounted with respect to said major section, so as selectively to be disposed in the same general plane with said major section to form a part of the back and to project laterally or horizontally outwardly beyond the major section above the main seat to form a second seat.

A further object is to provide in such a seat structure, novel and improved means for movably mounting the smaller section relative to the major section of the back, whereby the smaller section can be easily and quickly adjusted to serve either as a portion of the back of the main seat or as a second seat and shall be firmly supported when serving as a second seat.

Other objects of the invention are to provide in a seat structure of the character described, a novel and improved construction, combination and arrangement of parts whereby the invention may be easily and inexpensively embodied in automobile seats, railway car seats and the like of the usual type; to provide novel and improved means for embracing and holding a person, particularly a small child against falling from the second seat; and to obtain other advantages and results as will be brought out by the following description in conjunction with the accompanying drawings, in which Figure 1 is a fragmentary perspective view of a multiple seat structure embodying my invention, showing the seat structure in an automobile.

Figure 2 is a vertical sectional view on an enlarged scale, taken on the line 2—2 of Figure 1, showing the second seat in operative position.

Figure 3 is a similar view showing the second seat in inoperative position and serving as a part of the back for the main seat.

Figure 4 is a fragmentary horizontal sectional view on a further enlarged scale, taken on the line 4—4 of Figure 1, and Figure 5 is a fragmentary enlarged perspective view of a portion of one of the bracket arms and the brace for mounting the second seat on the main seat.

Specifically describing the illustrated embodiment of the invention, the multiple seat structure includes a suitable support A, such as the body of an automobile, on which is mounted a main seat B and a back C therefor. Preferably the seat and back are constructed in the usual way with cushions and are of a size to accommodate more than one person.

The back is shown as comprising a major section 1 in predetermined relation to the main seat B, and a smaller section 2 that normally is disposed in the same general vertical plane with the main section and can be swung laterally or horizontally forwardly beyond the main section above the main seat B to form a second seat. More particularly, the back C has an opening 3, preferably disposed adjacent one wall of the automobile body and the top of the main seat in which the second seat 2 is normally located with one surface in the same general plane with the front surface of the back so as to form a part of the back.

As shown, the smaller second seat section 2 of the back has a pair of bracket arms 4 rigidly connected thereto and projecting therefrom, one at each of two opposite sides of the section. Each bracket arm 4 has a stud 5 mounted in a slot 6 that extends longitudinally of a guide 7 approximately vertically disposed and fixedly connected to the support A, the stud 5 being free for pivotal movement and sliding movement longitudinally of the slot 6. As shown, each guide 7 comprises a metal angle bar having one flange connected to the support A as at 8 and the other flange 9 disposed in spaced and parallel relation to the support and having the slot 6; and the end of the corresponding bracket arm 4 is disposed between the flange 9 of the guide and the support A, as more clearly shown in Figures 2 and 4.

With this construction, it will be observed that the second seat section 2 may project horizontally outwardly beyond the back C as shown in Figures 1, 2 and 4, or may be swung into substantially the same general plane as the back as shown in Figure 3.

For supporting the second seat in its horizontally projected position, I may provide a pair of braces D, one for each bracket arm 4 and each comprising a plurality of sections 10 and 11 pivotally connected together at 12, with one end of one section pivotally connected at 13 to the corresponding bracket arm and the other end of the other section pivotally connected at 14 to the support A above the second seat section 2.

In operation of the invention, assuming the second seat section 2 to be in its normal position in the same general plane as the back C, as shown in Figure 3, to move the section 2 into a position to form a seat, the section is pulled outwardly pivotally about the studs 5 and the studs are slid downwardly in their respective slots 6. At the same time, the sections 10 and 11 of the braces D are pivotally moved into substantial alinement with each other so as to support the seat section 2 in its horizontal position as shown in Figure 2. When the seat section is in this position, it will be observed that the portion of the back C above the section 2 will serve as a back for the second seat, while the main seat B may serve as a foot rest for the person on the second seat. Also, a child on the second seat may be seated between the side wall of the automobile body and another person on the main seat so as to be protected against falling from the second seat.

To return the second seat to its normal position, the bracket arms 4 are tilted upwardly so as to slide the studs 5 upwardly in their slots 6, and at the same time the sections 10 and 11 of the braces are swung into angular relation to each other as shown in dotted lines in Figure 3, so as to permit the section 2 to enter the opening 3 in the back C and rest against the support A.

To hold the arms 4 against tilting upwardly under the weight of a person on the second seat 2, the slots 5 have lateral notches 15 in their lower ends in which the studs 5 are seated. To facilitate proper pivotal action of the brace sections 10 and 11 as the second seat is moved into inoperative position, the bracket arms 4 may have laterally projecting lugs 16 underlying the corresponding sections 11 of the braces to force said sections to swing outwardly as the bracket arms 4 are tilted upwardly to move the seat to its inoperative position.

Another feature of the invention is means for holding a child against being thrown from the second seat. This means is shown as comprising a U-shaped member 17 having its arms pivotally connected at 18 to the support so that said member may be swung horizontally outwardly in embracing relation to a person on the second seat as shown in Figures 1 and 2, or may be swung into an out-of-the-way position in a plane parallel to the general plane of the back C as shown in dotted lines in Figure 1 and in Figure 3. To accommodate the member 17 in the last mentioned position, the back may have slots 19 at each side of the section 2 and opening through the front and top of the back to receive the arms of the U-shaped member 17.

While I have shown and described the invention as embodied in certain details of construction, it will be understood that this is primarily for the purpose of illustrating the now preferred embodiment of the invention, and that many modifications and changes may be made in the details of structure without departing from the spirit or scope of the invention.

Having thus described my invention, what I claim is:

1. A multiple seat structure comprising a support, a main seat and a back therefor mounted on said support, said back including a major section in predetermined relation to said main seat and a smaller section, and means movably mounting said smaller section on said support above said main seat and including a pair of bracket arms rigidly connected to said smaller section, means slidably and pivotally connecting said arms to said support, and at least one brace comprising a plurality of pivotally connected sections, one of which is pivotally connected to one of said arms while another is pivotally connected to said support above said smaller section, whereby said smaller section is adapted selectively to be disposed in the same general plane with said major section and to project horizontally outwardly beyond said major section above said main seat to form a second seat.

2. A multiple seat structure comprising a support, a main seat and a back therefore mounted on said support, said back including a major section in predetermined relation to said main seat and a smaller section movably mounted on said support above said main seat and adapted selectively to be disposed in the same general plane with said major section and to project horizontally outwardly beyond said major section above said main seat to form a second seat, and means connected to said support selectively to embrace a person on said second seat and to be disposed in an out-of-the-way position when said second seat is out of use.

3. A multiple seat structure comprising a support, a main seat and a back therefore mounted on said support, said back including a major section in predetermined relation to said main seat and a smaller section movably mounted on said support above said main seat and adapted selectively to be disposed in the same general plane with said major section and to project horizontally outwardly beyond said major section above said main seat to form a second seat, and a U-shaped member having its arms pivotally connected to said support so that said member selectively can be swung outwardly beyond said back above the second seat to embrace a person thereon and can be swung into an out-of-the-way position into a plane approximately parallel to the general plane of said back.

4. A multiple seat structure comprising a support, a main seat and a back therefor mounted on said support, said back including a major section in predetermined relation to said main seat and a smaller section movably on said support above said main seat and adapted selectively to be disposed in the same general plane with said major section and to project horizontally outwardly beyond said major section above said main seat to form a second seat, said back having a vertical slot at each side of said smaller section opening through the front and top of the back, and a U-shaped member having its arms pivotally connected to said support so that said member normally can be disposed with its arms in said slots and in a plane approximately parallel to the general plane of said back and can be swung outwardly horizontally from said back to embrace a person on said second seat.

MARY TUCKARCH LOGAN.